Jan. 16, 1923. 1,442,612.
A. HARGRAVES.
SOLID TIRE GROOVING MACHINE.
FILED FEB. 17, 1920.
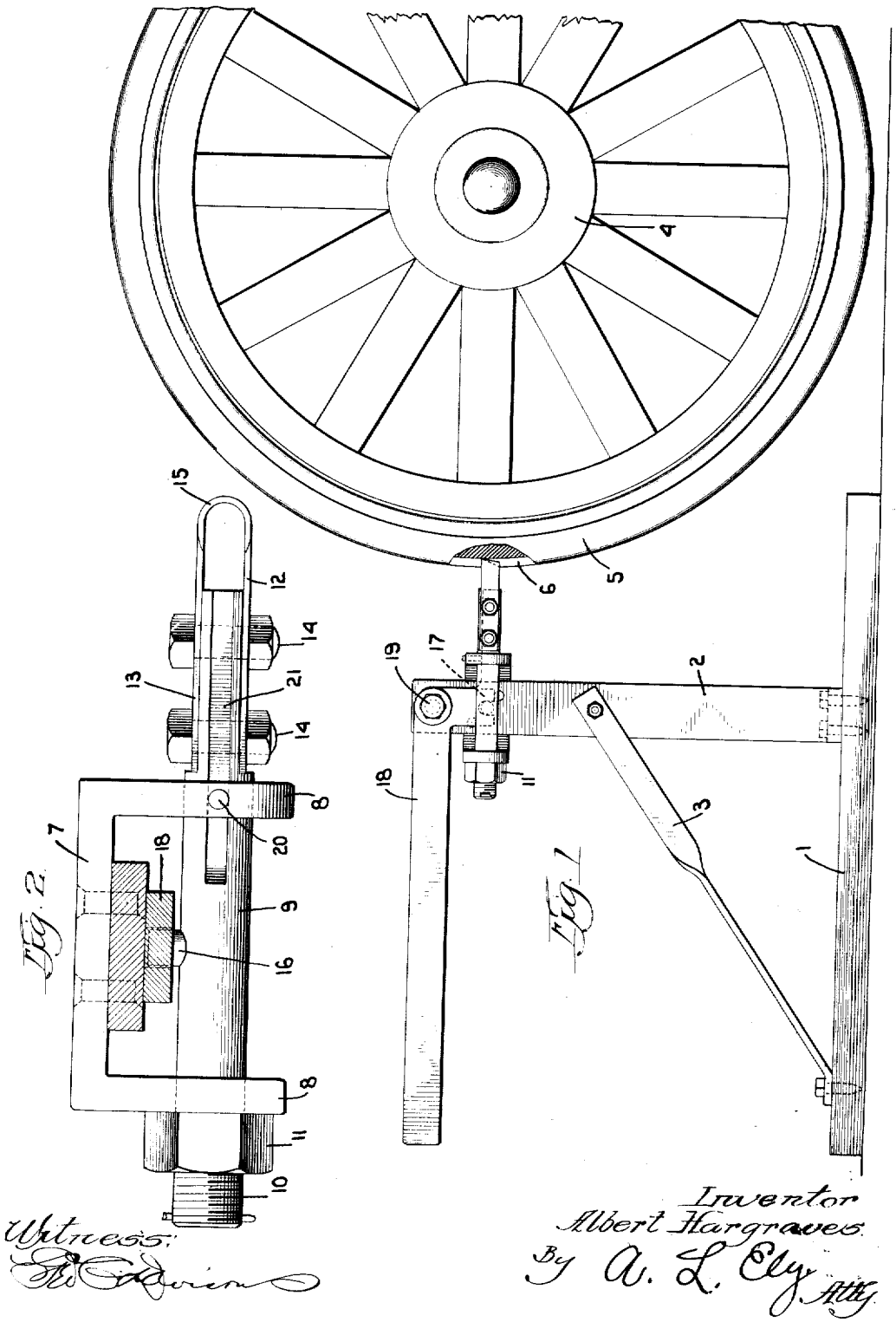
Inventor
Albert Hargraves
By A. L. Ely
Atty Patented Jan. 16, 1923.

1,442,612

UNITED STATES PATENT OFFICE.

ALBERT HARGRAVES, OF AKRON, OHIO, ASSIGNOR TO THE FIRESTONE TIRE AND RUBBER COMPANY, OF AKRON, OHIO, A CORPORATION OF OHIO.

SOLID-TIRE-GROOVING MACHINE.

Application filed February 17, 1920. Serial No. 359,456.

*To all whom it may concern:*

Be it known that I, ALBERT HARGRAVES, a citizen of the United States, residing at Akron, in the county of Summit, State of Ohio, have invented certain new and useful Improvements in Solid-Tire-Grooving Machines, of which the following is a specification.

This invention relates to an apparatus for cutting or regrooving solid tires which are used on trucks or similar heavy duty vehicles, in which grooves are desired in the surfaces of the tires. The grooves which are originally placed in the large truck tires of the type shown in patent to Lee Clough, No. 1,268,437, dated June 4, 1918, wear down in service until the tread of the tire is at or near the level of the bottom of the grooves, and in such condition are not as efficient in obtaining ventilation of the tire or traction. It then becomes necessary to regroove the solid tires, and it is for the purpose of providing a machine for regrooving these solid tires that my present application is directed.

In the drawings accompanying this application is shown one form of my invention, it being understood that changes and modifications may be made without departing from the invention contained herein.

In the drawings:

Fig. 1 is a side elevation of my device showing the apparatus in position for regrooving a tire.

Fig. 2 is a plan view of the apparatus.

This application is an improvement on my prior patented construction shown in Patent No. 1,404,118 dated January 17, 1922.

The apparatus comprises a base or bed plate 1, from which rises a standard 2 braced by a diagonal strut or struts 3.

A wheel of a truck elevated slightly from the ground is shown at 4, the tire at 5, and the groove is shown at 6 in the portion of the tire adjacent the knife (Fig. 1). To the upper end of the standard is fastened by its central portion a channel or U-shaped support or hanger 7, the arms 8 of which extend outwardly parallel and are provided with aligned apertures in which is slidably received a knife bar 9. On the portion of the knife bar furthest removed from the tire is formed a screw threaded portion 10 upon which is received a nut 11 intended to strike against the arm 8 and adjustably limit its outwardly movement. To the front end of the slidable knife bar is secured the knife blade, which may be made in any preferred form, that shown being in the form of a band of metal bent in U-form, the arms being laid against flattened sides of the knife bar as at 13 being secured by two or more bolts 14. The outer rounded extremity of the knife blade is shaped to conform to the groove desired to be made in the surface of the tire, the upper edge being sharpened to a knife blade as at 15.

At one side of the knife bar between the arms 8 is formed a lug or pin 16 which is received between the forks 17 formed on the end of an angular lever 18, which is pivoted at 19 on the upper extremity of the standard 2. A pin 20 is passed through one of the arms 8 and is received in a slot 21 on the side of the knife bar, preventing the bar from turning.

In use the apparatus is placed on the floor or ground adjacent the wheel of the truck which is to be regrooved. The rear wheel is jacked up a sufficient distance to clear the ground and the engine is started, revolving the rear wheels slowly. The apparatus having been placed in proper position, the lever 18 is depressed until the knife is fed in the proper distance which may be regulated by the nut 11.

The device shown and described herein presents a compact, economical device for regrooving solid tires and, while described in detail, is subject to variations in form and design within the limits of the invention as set forth in the appended claims.

I claim:

1. An apparatus for grooving solid tires, comprising a base adapted to be placed adjacent a vehicle wheel, an upright on said base, a pair of arms secured to the upright at approximately the height of the wheel center, a knife bar slidably mounted in said arms and a lever mechanism pivoted to the upright and connected to the knife bar to move the same toward and away from the wheel.

2. An apparatus for grooving solid tires comprising a base adapted to be placed adjacent a vehicle wheel, an upright on said base, a pair of arms secured to the upright at approximately the height of the wheel center, a knife bar slidably and non-rotatably mounted in said arms, a lever pivoted on said support, a connection between the lever and the bar and adjustable means to limit the inward movement of said bar.

ALBERT HARGRAVES.